(No Model.)
T. S. & A. M. E. STEWART.
CHURN DASHER.
No. 380,226. Patented Mar. 27, 1888.
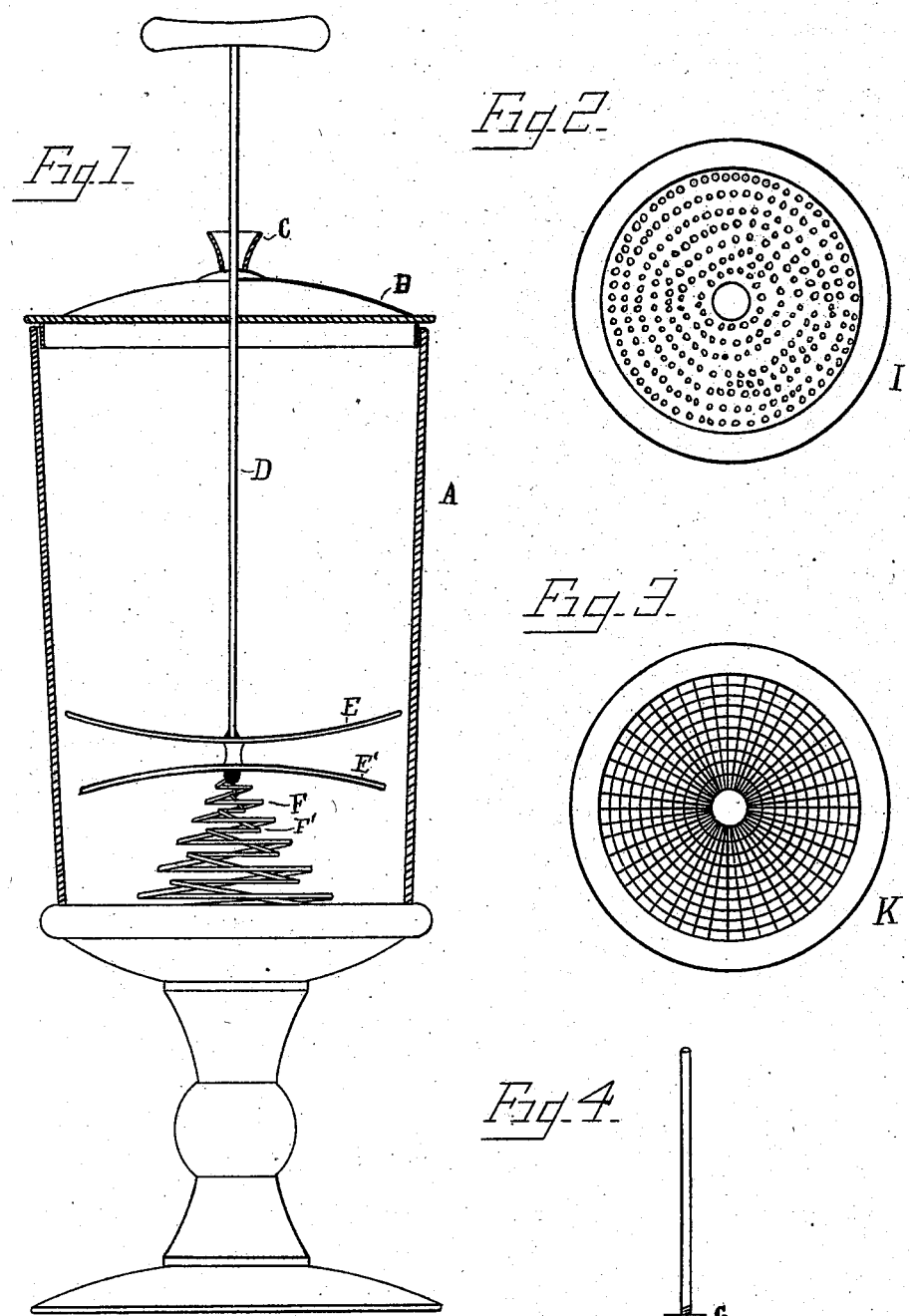

United States Patent Office.

THERON SPENCER STEWART AND ANNA MARIA ELIZABETH STEWART, OF TOLEDO, OHIO.

CHURN-DASHER.

SPECIFICATION forming part of Letters Patent No. 380,226, dated March 27, 1888.

Application filed April 25, 1887. Serial No. 236,124. (No model.)

*To all whom it may concern:*

Be it known that we, THERON SPENCER STEWART and ANNA MARIA ELIZABETH STEWART, citizens of the United States, residing at Toledo, in the county of Lucas and State of Ohio, have invented certain new and useful Improvements in Churn-Dashers; and we do hereby declare that the following is a full, clear, and exact description of the invention, which will enable others skilled in the art to which it appertains to make and use the same, reference being had to the accompanying drawings, and to the letters of reference marked thereon, which form part of this specification.

Our invention relates to an improved spring-dasher with disk attachments, and is designed to provide a beater or dasher that shall be adaptable to various household uses—as, for instance, an egg-beater or as a churn-dasher. We accomplish these objects by the mechanism illustrated in the accompanying drawings, in which like letters of reference indicate like parts throughout the several views.

Figure 1 is a sectional elevation. Figs. 2 and 3 are plan views illustrating the disks. Fig. 4 shows a modified form of attaching the disks and springs to the handle.

For the purpose of illustration, our device is shown in sectional elevation as employed in an egg-beater.

A designates a cylindrical vessel, preferably with slightly-inclined sides and provided with a cover, B, having an orifice in its center, through which the handle is reciprocated, the orifice being surrounded by a funnel-shaped guide, C, adapted to return any substance that may collect upon the handle and be caught therein back to the receptacle.

D is the handle or dasher-rod, and has attached at its lower end a helical spring or springs, in the present instance two springs, F and F', being shown, and has also two disks, E E', attached at a short distance above the springs. The disks are slightly convex, and are placed in inverse order upon the handle or dasher-rod D, the lower disk, E', being placed with its concave face toward the base of the receptacle, the convex face of the disk E being in the same relation. These disks are perforated, as shown at I, Fig. 2, or of woven wire, as shown at K, Fig. 3.

In Fig. 1 there are shown two helical springs, the helices being in reverse order, the disks E and E', as well as the springs F and F', being soldered to the handle D. When it is desired to construct the dasher with greater strength, for heavier work, as for churning, we prefer the mode of attaching shown in Fig. 4, wherein the handle is threaded, and is provided with burrs or nuts G G' G'' and thumb-screw H. In this construction the nut G is first run upon the handle a desired distance, the disk E is placed thereon, and nut G' run firmly against the disk. Disk E' is then placed upon the handles. Spring F is then placed thereon, its upper coils being of a diameter just sufficient to allow of its ready attachment, and nut G'' is run firmly to place, thereby holding disk E' and spring F firmly in position. Spring F' is now similarly attached and thumb-screw H screwed to place. By this adjustment great strength, as well as convenience in taking the parts off, if desired, is attained.

In operation the handle or dasher-rod D is reciprocated vertically, the springs F and F' opening and closing in the direction of their axis, the material to be beaten being first acted upon by the springs, which, being alternately closed and opened one within the other, give the initial beating, which is completed by the action of the disks. They, (the disks,) meeting the substance as it is forced through the coils, subject it to a secondary and more rigid beating, caused by the force with which it is urged through the perforations or interstices of the disks. The substance (if eggs are being beaten) is rapidly brought to a thoroughly beaten and foamy condition, producing a greater amount in bulk and of a more lasting character in its beaten state from a given amount of material than any beater of which we have any knowledge.

If the device is used as a churn-dasher, the same results follow, since by the combined action of the springs and disks the sacs containing the butyric particles are more rapidly broken, leaving it only necessary to "gather" or assemble the particles into compactness.

While we have shown two springs and two disks, a more or less number may be employed without departing from the spirit of our invention.

Having described our invention, what we claim, and desire to secure by Letters Patent, is—

In a dasher, a handle or dasher-rod having helical springs attached thereto, in combination with perforated convex disks attached thereon in inverse order, the disks and springs being removably attached to the dasher-rod, substantially as and for the purpose set forth.

In testimony that we claim the foregoing as our own we hereby affix our signatures in presence of two witnesses.

THERON SPENCER STEWART.
ANNA MARIA ELIZABETH STEWART.

Witnesses:
    J. E. RAYMER,
    WILLIAM WEBSTER.